United States Patent [19]
Okada et al.

[11] 4,156,237
[45] May 22, 1979

[54] COLORED DISPLAY SYSTEM FOR DISPLAYING COLORED PLANAR FIGURES

[75] Inventors: Kunihiro Okada, Tokyo; Kouichi Tanaka, Yokohama; Takeyuki Endoh; Shigeru Yabuuchi, both of Tokyo, all of Japan

[73] Assignees: Hitachi, Ltd.; Hitachi Denshi Kabushiki Kaisha, both of Japan

[21] Appl. No.: 825,372

[22] Filed: Aug. 17, 1977

[30] Foreign Application Priority Data

Aug. 25, 1976 [JP] Japan ................................ 51-100550

[51] Int. Cl.[2] .............................................. G06K 15/20

[52] U.S. Cl. .................................... 340/701; 340/729; 340/799; 340/803; 358/22; 358/183; 364/522

[58] Field of Search ................ 340/324 AD; 358/183, 358/22; 364/522

[56] References Cited

U.S. PATENT DOCUMENTS

| | | | |
|---|---|---|---|
| 3,665,408 | 5/1972 | Erdahl et al. | 340/324 AD |
| 3,747,087 | 7/1973 | Harrison et al. | 340/324 AD |
| 3,749,822 | 7/1973 | Van Der Veer et al. | 358/22 |
| 3,911,418 | 10/1975 | Takeda | 340/324 AD |
| 3,961,133 | 6/1976 | Bennett | 340/324 AD |
| 3,986,204 | 10/1976 | Smith | 358/22 |
| 4,021,841 | 5/1977 | Weinger | 358/183 |

*Primary Examiner*—David L. Trafton
*Attorney, Agent, or Firm*—Craig and Antonelli

[57] ABSTRACT

A colored display system for displaying a plurality of colored solid surfaces each of which is obtained by coloring or painting in a region, comprising circuit means for generating figure information signals representative of the respective solid surfaces, a priority circuit for selecting one of the figure information signals in response to a predetermined priority order when the figure information signals are simultaneously generated, a memory circuit for storing color information, circuit means for reading out the color information corresponding to the selected figure information signal from the memory circuit and a color cathode ray tube for displaying the colored solid surfaces in response to the color information read out.

10 Claims, 14 Drawing Figures

COLORED DISPLAY SYSTEM FOR DISPLAYING COLORED PLANAR FIGURES

BACKGROUND OF THE INVENTION

The present invention relates to a colored display system for displaying colored solid surfaces (plane surfaces) of plural kinds.

In recent display systems, it is often desired to display colored solid surfaces.

In a case where a plurality of colored solid surfaces are displayed under partially superposed conditions, a superposed portion of the figures is represented by a mixed color. Therefore, one cannot see such a portion very well.

In view of this problem, a colored display system has been proposed in Japanese Laid-Open patent Application No. 31532/72.

In this proposed system, a plurality of refresh memories are provided for storing color codes and data codes and a set of color code and data code is read out from each refresh memory. The color code and the data code are converted into color information and figure information signals, respectively, and are then combined. Next one of the combined informations corresponding to the respective refresh memories is selected in accordance with a desired priority order by a priority circuit and is then displayed on a screen of a colored cathode ray tube.

In the above-described display system, since information including color information on several signal lines is applied to the priority circuit, this circuit is quite complicated. Furthermore, it is necessary to provide a plurality of refresh memory for storing the color codes and the data codes to display on the screen. Thus, the prior art display system has a complicated construction.

SUMMARY OF THE INVENTION

An object of the present invention is to provide a colored display system which can dynamically display a plurality of solid surfaces on a screen while being simple in constitution.

In order to achieve this and other objects, the present invention is characterized by providing a colored display system comprising first means for generating a plurality of figure information signals representative of the corresponding solid surfaces, second means for selecting one of the plural figure information signals in response to a predetermined priority order when the plural figure information signals are simultaneously generated, third means for storing color information, fourth means for reading out the color information corresponding to the selected figure information signal from the third means and fifth means for displaying colored solid surfaces in response to the color information read out from the third means.

DETAILED DESCRIPTION OF THE PREFERRED EMBODIMENTS

Figure 1:
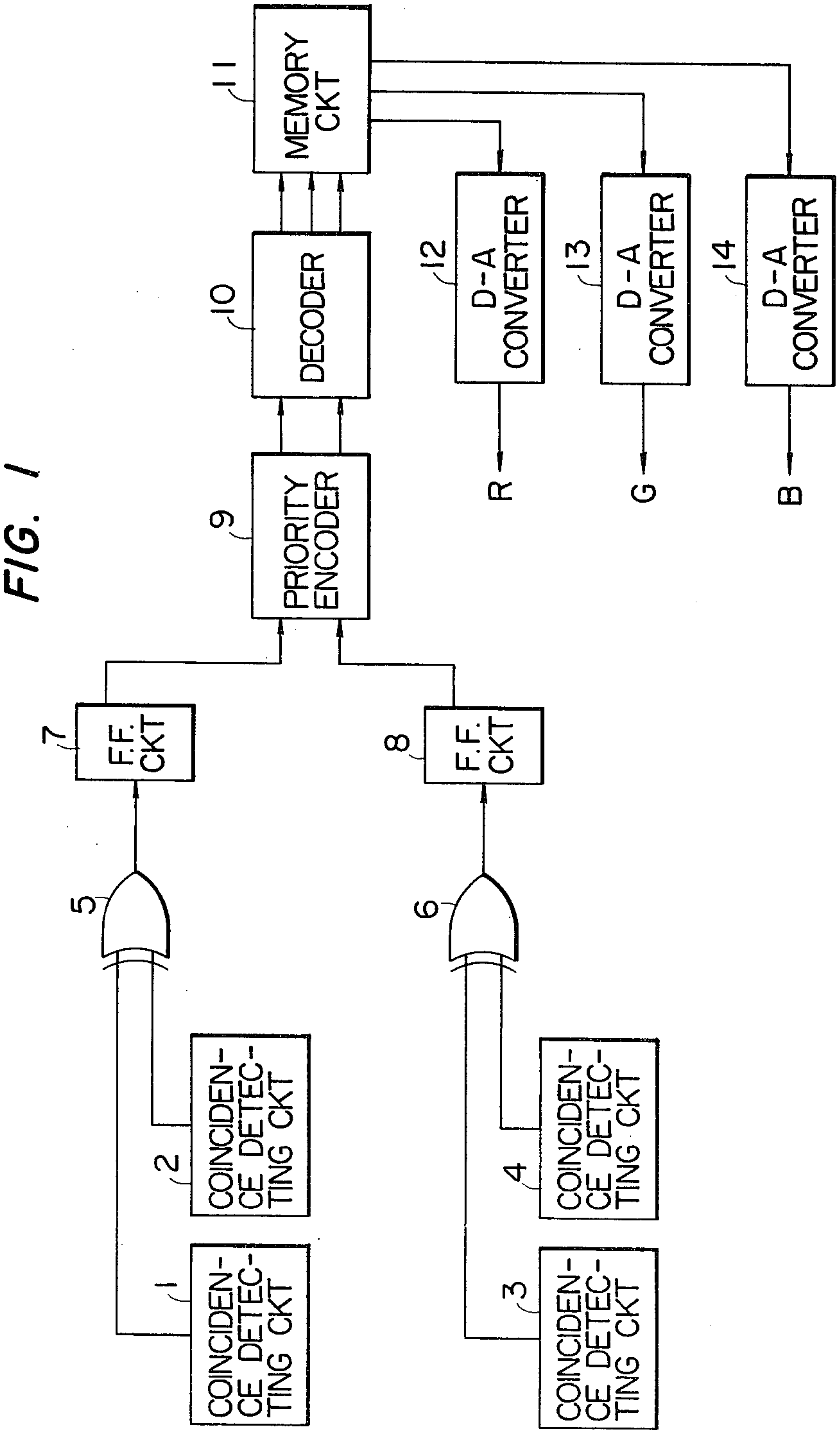
FIG. 1 is a circuit diagram illustrative of an embodiment of a display system according to the present invention.

Referring now to the drawings, and in particular to FIG. 1, an embodiment is shown of a colored display system according to the present invention.

In FIG. 1, numerals 1 through 4 denote coincidence detecting circuits; numerals 5 and 6 exclusive OR circuits, numerals 7 and 8 trigger flip-flop circuits, numeral 9 a priority encoder, numeral 10 a decoder, numeral 11 a memory circuit for storing color information and numerals 12 through 14 digital-analog converters.

The following three processings are mainly performed by a circuit of FIG. 1:

(1) forming a plurality of solid surfaces in a sequence scanning system;

(2) processing of superposed portions of the solid surfaces; and (3) processing of cross points of two line segments by which a solid surface is surrounded.

First, the processing (1) will be described below.

Figure 2:
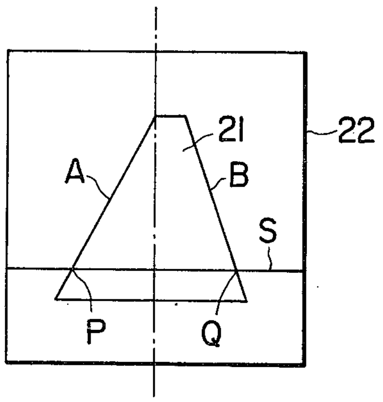
FIG. 2 is a diagram showing an example of a solid surface displayed on a screen.

FIG. 2 shows an example of a colored solid surface on a screen. A planar figure 21 is formed by wholly coloring or painting in a square held between two line segments A and B and is displayed on a screen 22 of a standard color television with horizontal scanning.

Figure 3:
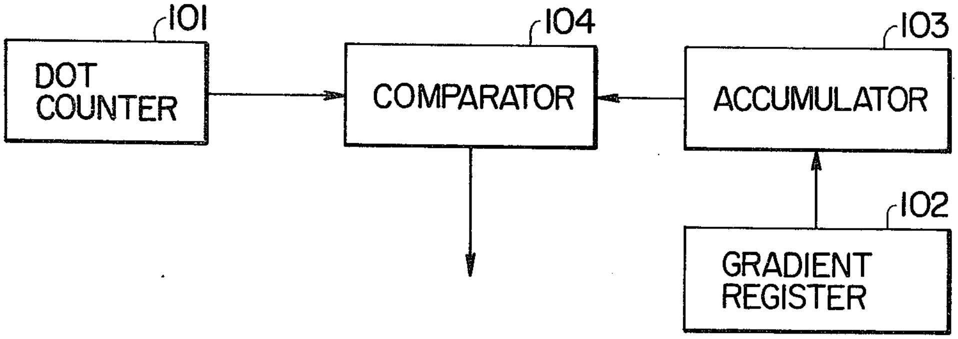
FIG. 3 is a circuit diagram showing an embodiment of a coincidence detecting circuit shown in FIG. 1.

FIG. 3 shows an embodiment of each of coincidence detecting circuits 1 through 4. A dot counter 101 is provided for representing beam position on a horizontal scanning line S scanned at a present time. If it is presumed that the left and right ends of the horizontal scanning lines are represented with $-256$ and $+255$, respectively, the dot counter 101 is set to $-256$ at scanning initial time of the scanning lines and counts by 5/2 during a period for scanning from the left end to the right end. A gradient register 102 is provided for storing the gradient of a line segment, for example, line segment A. The gradient in the register 102 is accumulated during every scanning of a horizontal scanning line by an accumulator 103. Therefore, the contents of the accumulator 103 represent the position of the line segment on the horizontal scanning line scanned at a present time. The contents of the dot counter 101 and the accumulator 103 are compared with each other and a coincidence signal is derived from the comparator 104 when the contents thereof coincide with each other, that is, when the now scanning position coincides with the position on the line segment.

If it is presumed that the coincidence detecting circuits 1 and 2 are provided for detecting the coincidence of the scanning position with the positions P and Q on the line segments A and B, respectively, the flip-flop circuit 7 is set and reset when the scanning position coincide with the positions P and Q on the line segments A and B, respectively. From the flip-flop 7, is derived a signal "1" that is, the figure information for coloring or painting in a square held between the line segments A and B, by scanning from the bottom scanning line to the top scanning line. Next, the processing (2) is described below.

Figure 4:
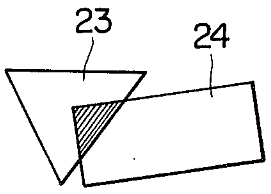
FIGS. 4 and 5 are diagrams illustrative of an example of two solid surfaces displayed in a partially superposed condition.

FIG. 4 shows a case where two solid surfaces 23 and 24 are displayed in a partially superposed condition. In such a case, a superposed portion of two solid surfaces is displayed with either one of the colors corresponding to two solid surfaces as in FIG. 5. That is, when a triangle 25 held between line segments A and B is partially superposed on a triangle 26 held between line segments C and D, a superposed portion is displayed with a color corresponding to the triangle 25, for example.

Figure 5:
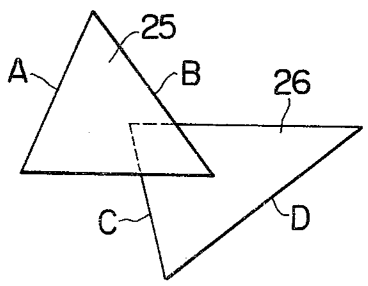

If it is presumed that the coincidence detecting circuits 1, 2, 3 and 4 are provided for detecting the coincidence of the scanning position with the positions on line segments A, B, C and D of FIG. 5, respectively, figure information signals representative of triangles 25 and 26 are derived from the flip-flop circuits 7 and 8, respectively.

In detail, a signal "1" is supplied through the exclusive OR circuit (hereinafter represented by "EOR") 5 to the flip-flop circuit 7 when the scanning position arrives at a position on the line segment A and the flip-flop circuit 7 is then set a signal "1" is supplied through the EOR 5 to the flip-flop circuit 7 when the scanning position arrives at a position the line segment B and the flip-flop circuit 7 is reset.

On the other hand, a signal "1" is supplied through the EOR 6 to the flip-flop circuit 8 when the scanning position arrives at a position on the line segment C and the flip-flop circuit 8 is then set. A signal "1" is supplied through the EOR 6 to the flip-flop circuit 8 when the scanning position arrives at a position on the line segment D and the circuit 8 is then reset. "1" signals are derived from the flip-flop circuits 7 and 8 during periods when the flip-flop circuits 7 and 8 are set, respectively. Figure information signals from the flip-flop circuits 7 and 8 are applied to the priority encoder 9.

Figure 6:
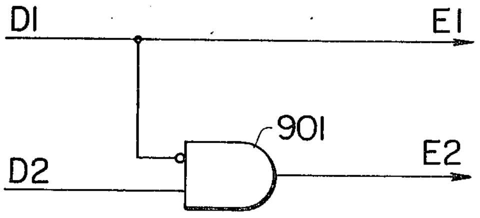
FIG. 6 is a circuit diagram showing an embodiment of a priority encoder shown in FIG. 1.

FIG. 6 shows an embodiment of the priority encoder 9. In FIG. 6, a signal D1 from the flip-flop circuit 7 is directly applied to the decoder 10 as a signal E1. On the other hand, a signal D2 from the flip-flop circuit 8 is through an AND circuit 901 to the decoder 1D as a signal E2 only when no signal D1 is derived from the flip-flop circuit 7. In short, figure information from the flip-flop circuit 7 is preferentially selected by the priority encoder 9.

The memory circuit 11 is provided for storing color information. An address of the memory circuit 11 is designated in response to the signal E1 and E2 from the priority encoder 9 by the decoder 10. Color information is read out from the memory circuit 11 in response to the address from the decoder 10 and is converted into color signal R, G or B by the digital-analog converter 12, 13 or 14. The color signals R, G and B are then displayed on the screen of the color cathode ray tube.

Furthermore, the processing (3) is described below.

Figure 7:
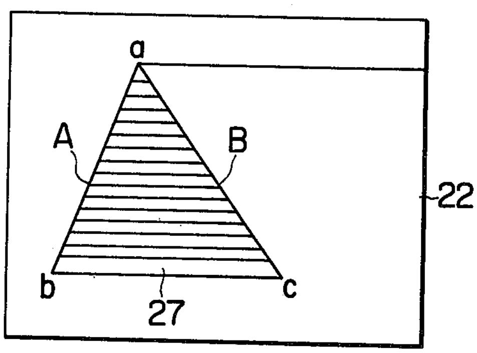
FIG. 7 is a diagram showing an example of a solid surface displayed on a screen.

In a case that a triangle 27 such as shown in FIG. 7 is displayed, the coincidence signals from the coincidence detecting circuits 1 and 2 are simultaneously obtained only once on a horizontal scanning line when the scanning position coincides with the cross point a between the line segments A and B. Therefore, if the coincidence signals from the circuits 1 and 2 are directly applied to the flip-flop circuit 7, an undesirable line starting the point a is drawn on the screen 22. According to the embodiment of the present invention, since the coincidence signals from the detecting circuits 1 and 2 are supplied through the EOR 5 to the flip-flop circuit 7, there are eliminated coincidence signals generated when the scanning position coincides with the cross point between the line segments A and B. In a similar manner, the coincidence signals simultaneously generated from the detecting circuits 3 and 4 are eliminated by means of the EOR 6.

According to the embodiment described above, the following functions are performed.

(a) It is easy to display a colored solid surface by coloring or painting in a desired region.

(b) It is possible to display a superposed portion of a plurality of solid surfaces with a selected one of colors corresponding to the solid surfaces.

(c) An error signal never generates even when the scanning position arrives at a cross point between the line segments.

As compared with the prior art display system, the present invention is mainly characterized by making the circuit construction simpler. That is, since color information is generated after figure information is selected in a priority order, the priority encoder 9 and the memory circuit 11 can be constructed with remarkably simple circuits.

Figure 8:
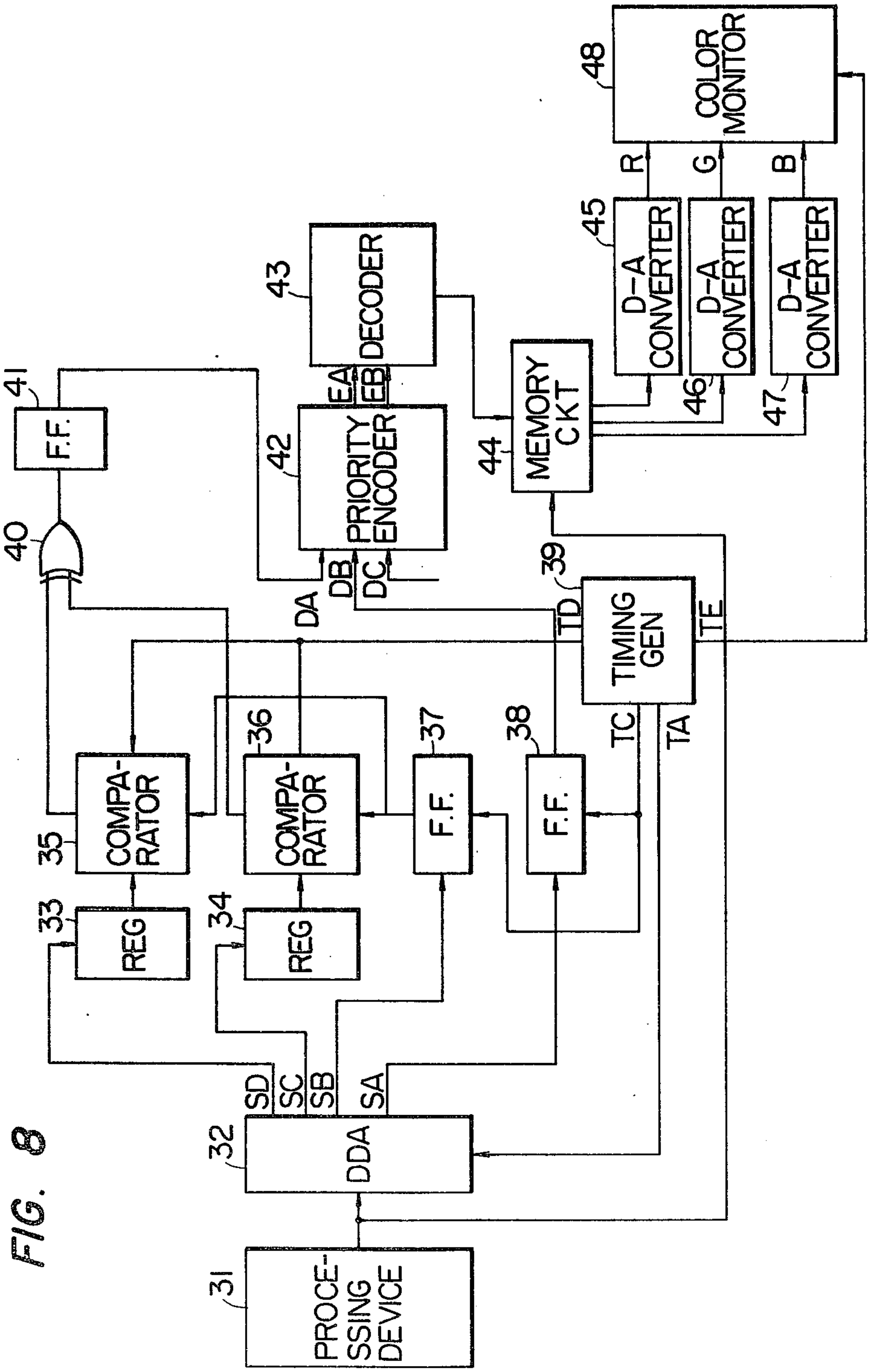
FIG. 8 is a circuit diagram illustrative of another embodiment of a colored display system according to the present invention.

FIG. 8 shows another embodiment of a colored display system according to the present invention.

In FIG. 8, numeral 31 denotes a processing device, numeral 32 a digital differential analyzer (hereinafter represented by "DDA"), numerals 33 and 34 registers, numerals 35 and 36 comparators, numerals 37 and 38 flip-flop circuits, numeral 39 a timing generator, numeral 40 an EOR, numeral 41 a trigger flip-flop circuit, numeral 42 a priority encoder, numeral 43 a decoder, numeral 44 a memory circuit, numerals 45 through 47 digital to analog converters, and numeral 48 a color monitor (color Braun tube).

Figure 9:
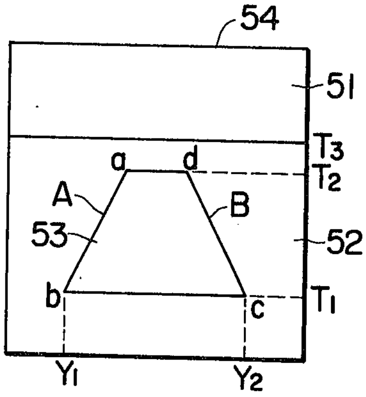
FIG. 9 is a diagram showing an example of three solid surfaces displayed on a screen.

FIG. 9 shows an example of solid surfaces displayed on a screen.

In FIG. 9, three solid surfaces 51 through 53 are displayed on a screen 54. That is, the solid surface 51 is displayed as a background over a full region of the screen and the solid surface 52 is preferentially displayed on the solid surface 51. Furthermore, the solid surface 53 is preferentially displayed on the solid surface 52.

The operation of a circuit in FIG. 8 is described below with respect to display of a figure shown in FIG. 9.

It is presumed that the screen 54 of FIG. 9 is scanned in a direction from the bottom horizontal scanning line to the top horizontal scanning line.

Figure 10:
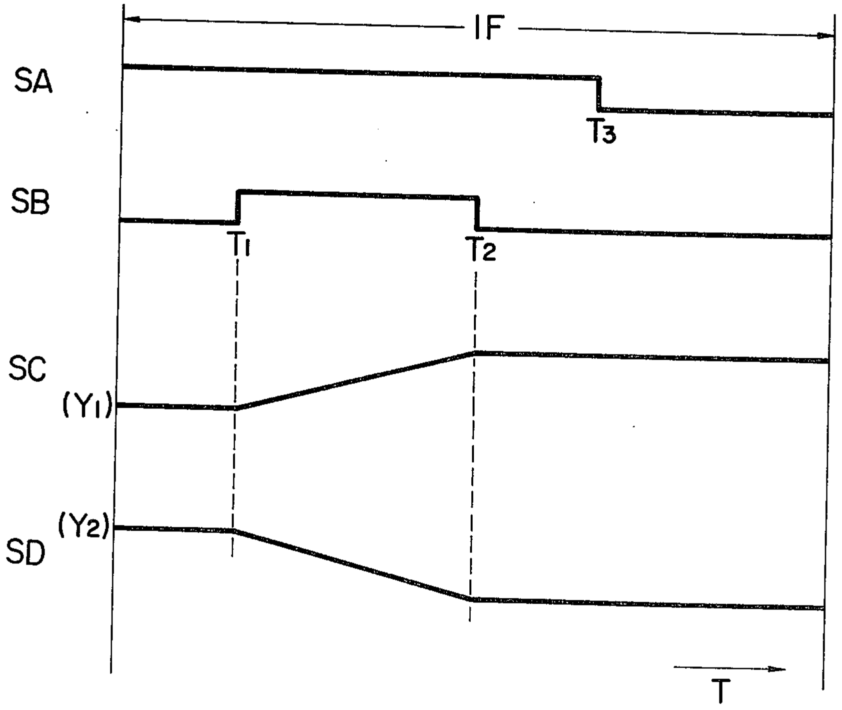
FIG. 10 is a diagram showing an example of output waveform of a DDA (digital differential analyzer) such as shown in FIG. 8.

The processing device 31 is provided for setting an initial condition to the DDA 32 and for previously writing color information into the memory circuit 44. The DDA 32 is provided for generating signals SA, SB, SC and SD shown in FIG. 10. The signal SA corresponds to a period for displaying the solid surface 52 and the signal SB corresponds to a period for displaying the solid surface 53. Furthermore, the signals SC and SD represent the positions on the line segments A and B.

Figure 11:
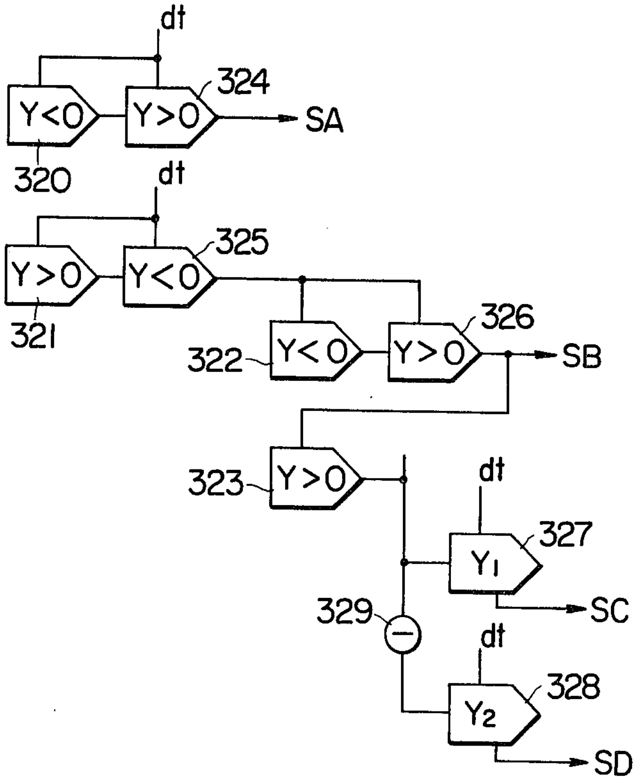
FIG. 11 is a circuit diagram illustrative of an embodiment of a DDA such as shown in FIG. 8.

FIG. 11 shows an embodiment of the DDA shown in FIG. 8.

In FIG. 11, numerals 320 through 323 indicate coefficient multipliers for multiplying a first increment by 1/K (K is equal to or more than 1), numerals 324 through 326 indicate comparators which continues to output a third increment during a period when a value of the Y register therein is positive, numerals 327 and 328 indicate integrators and numeral 329 indicates an inverter. A value of the Y register in each of the coefficient multipliers 321 and 323 and the comparators 324 and 326 is previously set to a positive value and a value of the Y register in each of the coefficient multipliers 320 and 322 and the comparator 325 is previously set to a negative value.

Since a value of the Y register in the comparator 324 is positive when the operation of the DDA is started, the third increment of the comparator 324 is outputted as signal SA. The third increment of the comparator 324 is not outputted after a time $T_3$ when a value of the Y register in the comparator 324 becomes negative.

The third increment of the comparator 325 is outputted after a time $T_1$. A value of the Y register in the comparator 326 is decreased by the thus obtained third increment and the third increment of the comparator 326 is not outputted after a time $T_2$. Therefore, the third increment of the comparator 326 is outputted as signal SB during a period from $T_1$ to $T_2$.

Values of the Y registers in the integrators 327 and 328 are set to initial values $Y_1$ and $Y_2$, respectively. These initial values $Y_1$ and $Y_2$ correspond to points b and c representative of bottom points of the line segments A and B shown in FIG. 9. Outputs of the coefficient multiplier 323 and the inverter 329 are integrated by the integrators 327 and 328. Third increments of the integrators 327 and 328 are outputted as signals SC and SD during a period from $T_1$ to $T_2$. These signals SC and SD correspond to the positions on the line segments A and B.

The signals SA and SB are applied to flip-flop circuits 38 and 37 and the signals SC and SD are stored in the registers 33 and 34.

The timing generator 39 is provided for generating various timing signals applied to the DDA 32, the flip-flop circuits 37 and 38, the comparators 35 and 36 and the color monitor 48.

Figure 12:
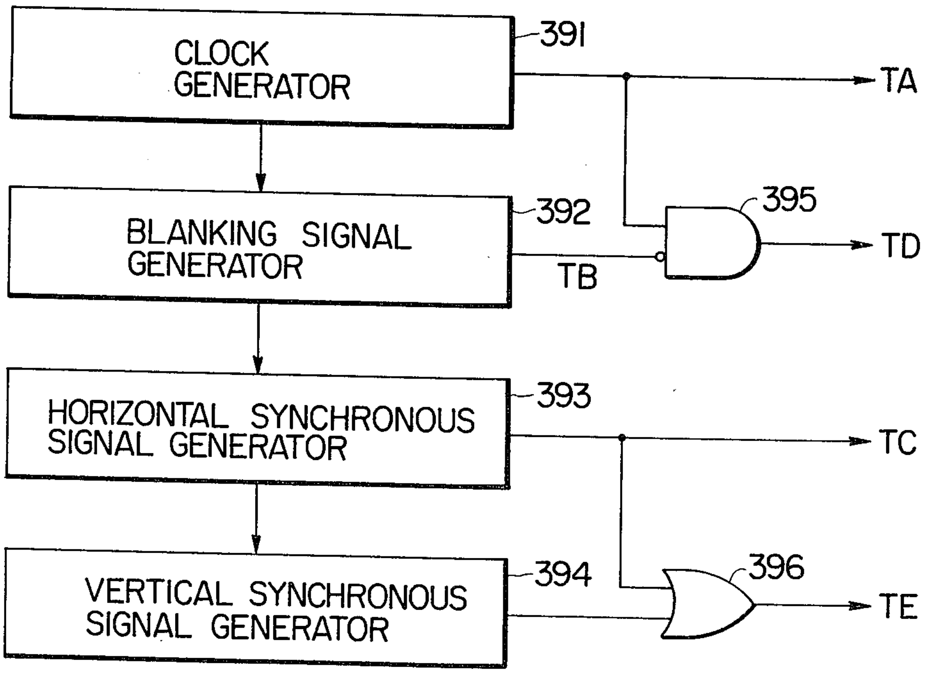
FIG. 12 is a circuit diagram showing an embodiment of a timing generator such as shown in FIG. 8.

FIG. 12 shows an embodiment of the timing generator 39.

In FIG. 12, numeral 391 denotes a clock generator for generating a series of basic clock pulses, numeral 392 a blanking signal generator for generating a blanking signal, numeral 393 a horizontal synchronous signal generator for generating a horizontal synchronous signal, numeral 394 a vertical synchronous signal generator for generating a vertical synchronous signal, numeral 395 an AND circuit and numeral 396 an OR circuit.

Figure 13:
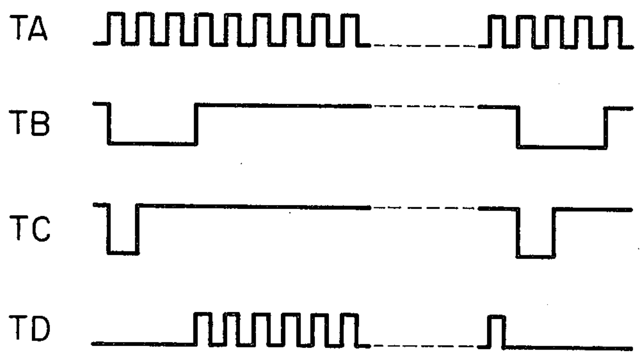
FIG. 13 is a diagram showing an example of signal waveforms of portions of a circuit shown in FIG. 12.

FIG. 13 shows signal waveforms of portions of the circuit in FIG. 12.

A series of clock pulses TA from the clock generator 391 are applied a signal dt to the DDA 32. The clock pulses TA from the clock generator 391 and the blanking signal TB from the blanking generator 392 are applied to the AND circuit 395 and a signal TD from the AND circuit 395 is applied to the comparators 35 and 36. The horizontal synchronous signal TC from the generator 393 is applied to the flip-flop circuits 37 and 38 to reset and, further, the horizontal synchronous signal TC and the vertical synchronous signal from the generator 394 are applied as a signal TE to the color monitor 48.

The comparators 35 and 36 are provided for detecting the coincidence between the now scanning position and the position on the line segment.

In the comparators 35 and 36, the contents of the registers 33 and 34 are counted down by signal pulses TD from the timing generator 39 during a set period $T_1$-$T_2$ of the flip-flop 37. When the contents of the registers 33 and 34 are counted down to zero, coincidence signals are derived from the respective comparators 35 and 36 and are applied through the EOR 40 to the flip-flop 41. Figure information for displaying the solid surface 53 of FIG. 9 is outputted from the flip-flop 41 and is applied as a signal DA to the priority encoder 42. The signal SA set in the flip-flop 38 is applied as a signal DB to the priority encoder 42 and, further, a "1" signal is applied as a signal DC to the priority encoder 42. The signal DB and DC correspond to the solid surfaces 52 and 51 shown in FIG. 9, respectively.

The priority encoder 42 is provided for selecting figure information DA, DB or DC in response to a desired priority order.

Figure 14:
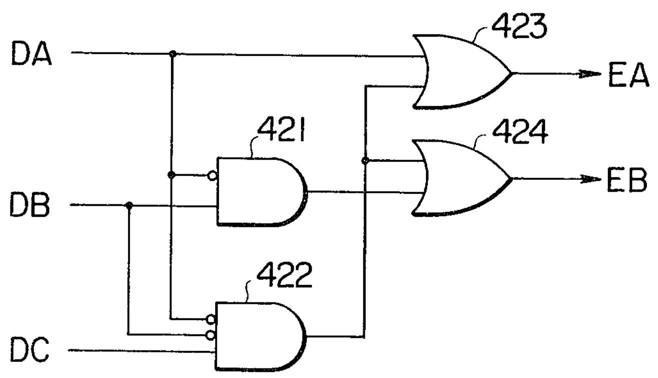
FIG. 14 is a circuit diagram showing an embodiment of a priority encoder shown in FIG. 8.

FIG. 14 shows an embodiment of the priority encoder 42. In FIG. 14, numerals 421 and 422 designate AND circuits and numerals 423 and 424 denote OR circuits. In the priority encoder 42, figure information is selected in response to a priority order DA>DB>DC. Selected figure information signals DA and DB are outputted as signals EA and EB, respectively, and selected figure information DC is outputted as signals EA and EB.

The decoder 43, the memory circuit 44 and the converters 45 through 47 correspond to the decoder 10, the memory circuit 11 and the converters 12 through 14 shown in FIG. 1, respectively. Outputs of the converters 45 through 47 are displayed on a screen of the color monitor 48.

Although circuits of the embodiments described above are shown as being constructed with digital elements, it is, of course, possible to construct these circuits with analog elements. Furthermore, the number of solid surfaces which can be displayed is not restricted to two or three.

We claim:

1. A colored display system comprising:
- first means for generating a plurality of figure information signals representative of corresponding solid surfaces;
- second means connected with said first means, for selecting one of the plurality of figure information signals from said first means in response to a predetermined priority order when the plural figure information signals are simultaneously generated by said first means;
- third means for storing color information corresponding to the respective figure information signals;
- fourth means connected with said second and third means, for reading out the color information from said third means corresponding to the figure information signal selected by said second means; and
- fifth means connected with said third means, for displaying colored solid surfaces in response to the color information data read out from said third means.

2. A colored display system according to claim 1, in which said fifth means includes converter means for converting the color information read out from said third means into analog information and a color monitor for displaying the analog information from said converter.

3. A colored display system according to claim 2, in which said first means includes detecting means for generating first and second coincidence signals when a now scanning position of said color monitor coincides respectively with the positions of two line segments surrounding a solid surface, and generating means connected with said detecting means for generating the figure information signal in response to the first and second coincidence signals.

4. A colored display system according to claim 3, in which said generating means includes an exclusive OR circuit for obtaining an exclusive OR logic between the first and second coincidence signals and a trigger flip-flop which is set or reset in response to the output of said exclusive OR circuit.

5. A colored display system according to claim 3, in which said detecting means includes register means for setting the positions of the two line segments, circuit means for representing the now scanning position of the color monitor, and comparator means for comparing the now scanning position from said circuit means and the positions from said register means so as to generate the first and second coincidence signals.

6. A colored display system according to claim 5, in which said detecting means further includes a digital differential analyzer for generating the position signals of the two line segments to be set in said register means.

7. A colored display system according to claim 1, in which said first means includes a digital differential analyzer for generating the signals corresponding to the figure information.

8. A colored display system according to claim 1, wherein the second means comprises a first channel for coupling one of said plural figure information signals directly to the fourth means and one or more additional channels for coupling the other figure information signals to the fourth means only when said one of the plural figure information signals is not present.

9. A colored display system for providing a display having the color of one solid surface to portions where a plurality of solid surfaces are superposed comprising:

first means for generating a plurality of figure information signals representative of corresponding solid surfaces;

second means connected with said first means, for selecting one of the plurality of figure information signals from said first means in response to a predetermined priority order when the plural figure information signals are simultaneously generated by said first means to represent a condition of portions of the solid surfaces being superposed;

third means for storing color information corresponding to the respective figure information signals;

fourth means connected with said second and third means, for reading out color information from said third means corresponding to the figure information signal selected by said second means so that the color of the superposed portion of the solid surfaces will be the color corresponding to that of the selected figure information signal; and fifth means connected with said third means, for displaying colored solid surfaces in response to the color information read out from said third means.

10. A colored display system according to claim 9, wherein the second means comprises a first channel for coupling one of said plural figure information signals directly to the fourth means and one or more additional channels for coupling the other figure information signals to the fourth means only when said one of the plural figure information signals is not present.

* * * * *